Figure 1:
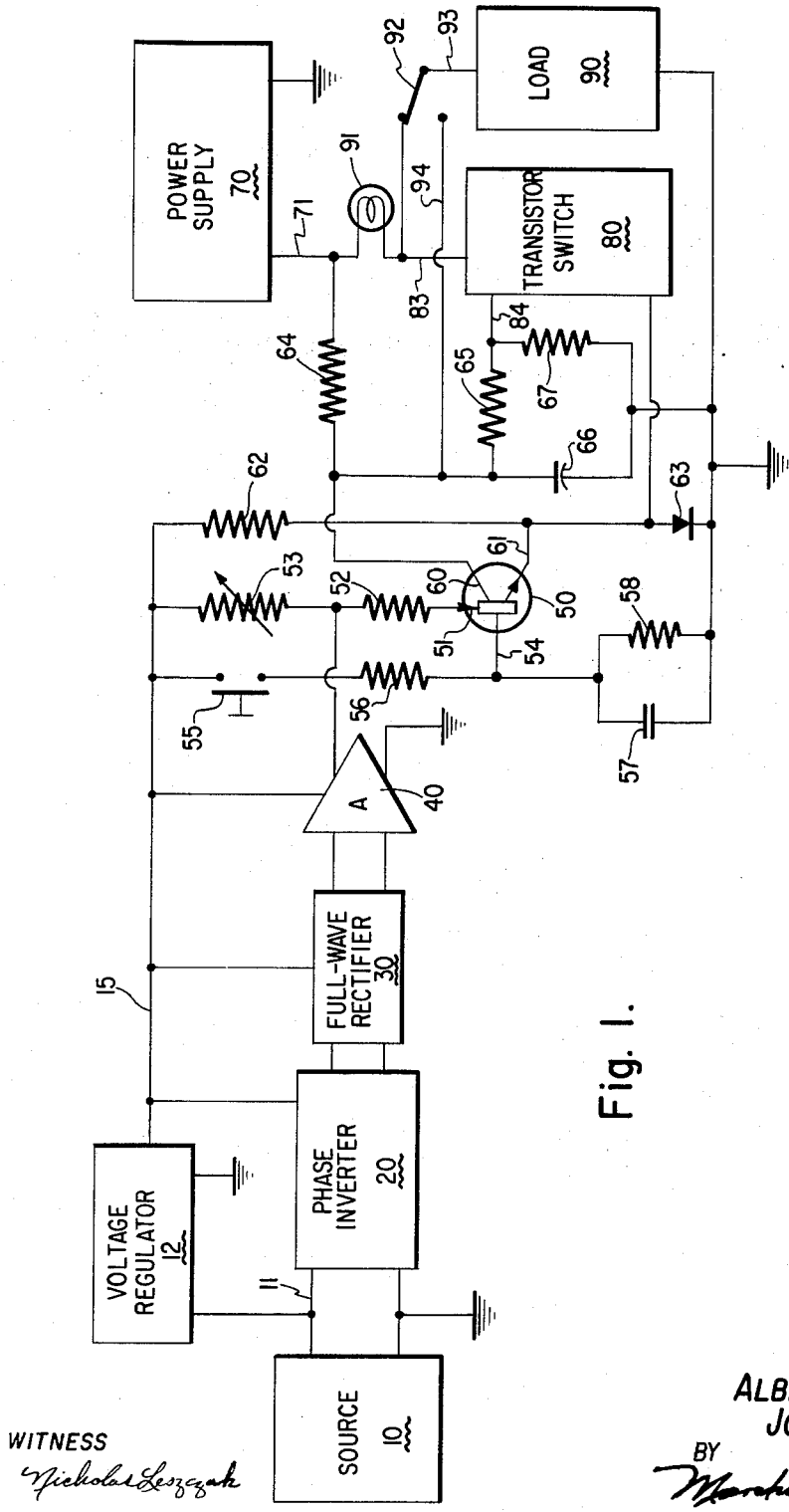

May 31, 1966 A. J. SCHIRO ETAL 3,254,235
SIGNAL MONITORING INSTRUMENT
Filed July 15, 1963 2 Sheets-Sheet 1

Fig. I.

INVENTORS.
ALBERT J. SCHIRO AND
JOHN E. McBRIAN
BY
*Marshall J. Brien*
ATTORNEY

WITNESS
*Nicholas Leszczak*

INVENTORS.
ALBERT J. SCHIRO AND
JOHN E. McBRIAN
BY
Marshall J. Breen
ATTORNEY

United States Patent Office 3,254,235
Patented May 31, 1966

3,254,235
SIGNAL MONITORING INSTRUMENT
Albert J. Schiro, Trumbull, and John E. McBrian, Old Saybrook, Conn., assignors to The Singer Company, New York, N.Y., a corporation of New Jersey
Filed July 15, 1963, Ser. No. 295,078
14 Claims. (Cl. 307—88.5)

This invention relates to apparatus for monitoring electrical signals and more particularly variations from the quiescent level of such signals.

In monitoring variations of a direct-current signal from a predetermined quiescent signal level, it is desirable to be able to detect and respond to both positive and negative voltage or current changes with respect to that level. In many applications of monitors, it is desirable and often a requirement that continuous and optimally reliable operation be obtainable at low cost. Accordingly, such a system should be constructed of components resistant to vibration, providing reliable operation over long periods of time, and which require a minimum amount of servicing and repair. As continuity of operation is important, determination of causes of failure of the system and repair should be quick and simple.

Monitors are used in security detection systems. In such applications motion within a secured zone or tampering with the connections between a source of the signal to be monitored and the monitor are events requiring response by the system. In a monitoring device used for such purposes, provision should be made for detecting and responding positively to such events.

In some cases, the connection or link between a transducer or receiver and the monitor may be severed completely and it can be most important in such cases that an immediate positive response to such an event be made by the monitor.

As vacuum tubes and sensitive relays are likely to be less reliable than semiconductor devices, it is desirable that a monitor system incorporate semiconductor components in preference to vacuum tubes, sensitive relays and the like which can be affected by dirt, wear, vibration, orientation, balance, etc., and are relatively bulky, heavy and frequently, less economical. Moreover, semiconductor devices are frequently more efficient and require less power. When sizes of power supplies and batteries are limited by weight and economic considerations, the use of semiconductor circuitry is of even greater importance.

If it is desired to transmit signals over the line facilities of a common carrier, it is desirable to be able to utilize low level quiescent signals at the input to the monitor. Here semiconductors offer significant advantages insofar as less power is required to drive the circuits than is required to drive relays or many types of electron tubes, so, often less power amplification is necessary.

Furthermore, it is desirable than such a system be capable of distinguishing between insignificant transient signals and changes in power supply levels when these are irrelevant to the information for which the monitor is desired to provide a response. Accordingly, adjustments of portions of the system or devices within the system should permit discrimination between noise, transients, or changes of power level, etc., and significant information being presented to the monitor.

In accordance with this invention an electrical monitor circuit responsive to variations of an electrical signal from a direct-current signal level is provided.

Variations from the direct-current signal level of the source are coupled to a first input circuit of a transistor circuit. A bistable output circuit in the transistor circuit operates in normal and abnormal conditions depending, in part, upon the state of the input signal. Transfer of operation of the transistor circuit from the normal condition to the abnormal condition is obtainable in response to deviation of the component of the input signal coupled to the first input circuit from a normal quiescent level. A second input circuit of the transistor circuit is actuable to transfer it back to the normal condition from the abnormal condition. Then the output circuit will remain in stable operation in its normal condition in the absence of deviation of the component of the input signal coupled to the first input circuit from the normal quiescent value. Similarly, the output circuit will remain in stable operation in the abnormal condition in the absence of actuation of the second input circuit, after it has been actuated into the abnormal condition. The output circuit of the transistor circuit is coupled to a coupling unit adapted to supply an output signal to a load, so that the ouput signal varies as a function of operation in the normal and abnormal conditions.

In another aspect of this invention the transistor circuit includes a four terminal latching transistor having a latching terminal connected in the first input circuit, a reset terminal connected in the second input circuit and a pair of output terminals connected in the output circuit.

In a further aspect of this invention the transistor circuit includes a PNPN transistor having injector, collector, base and emitter electrodes. The injector is connected in the first input circuit and the collector and emitter are connected in the output circuit. The base is connected in the second input circuit.

The first input circuit can be coupled to the source through a phase inverter and a full-wave rectifier to provide response to variations of either polarity from the normal quiescent level of the input signal from the source.

An amplifier can be connected between the output of the full-wave rectifier and the first input circuit in order to provide the desired degree of sensitivity of the monitor.

In accordance with this invention, the PNPN transistor can comprise a "binistor" tetrode.

In another aspect of this invention the first input circuit can be supplied with the direct-current component of the input signal from a source to be monitored through suitable coupling devices. So that a response of the system can be obtained in the event of a discontinuity in the level of the direct current component of the input signal, such as turning it off or temporary interruption, an independent source of power is connected in the output circuit for providing power to it and to a load which may be coupled to the output circuit. Such a sharp change in the D.C. level of the input signal will be sufficient to cause positive operation in the abnormal condition.

Figure 2:
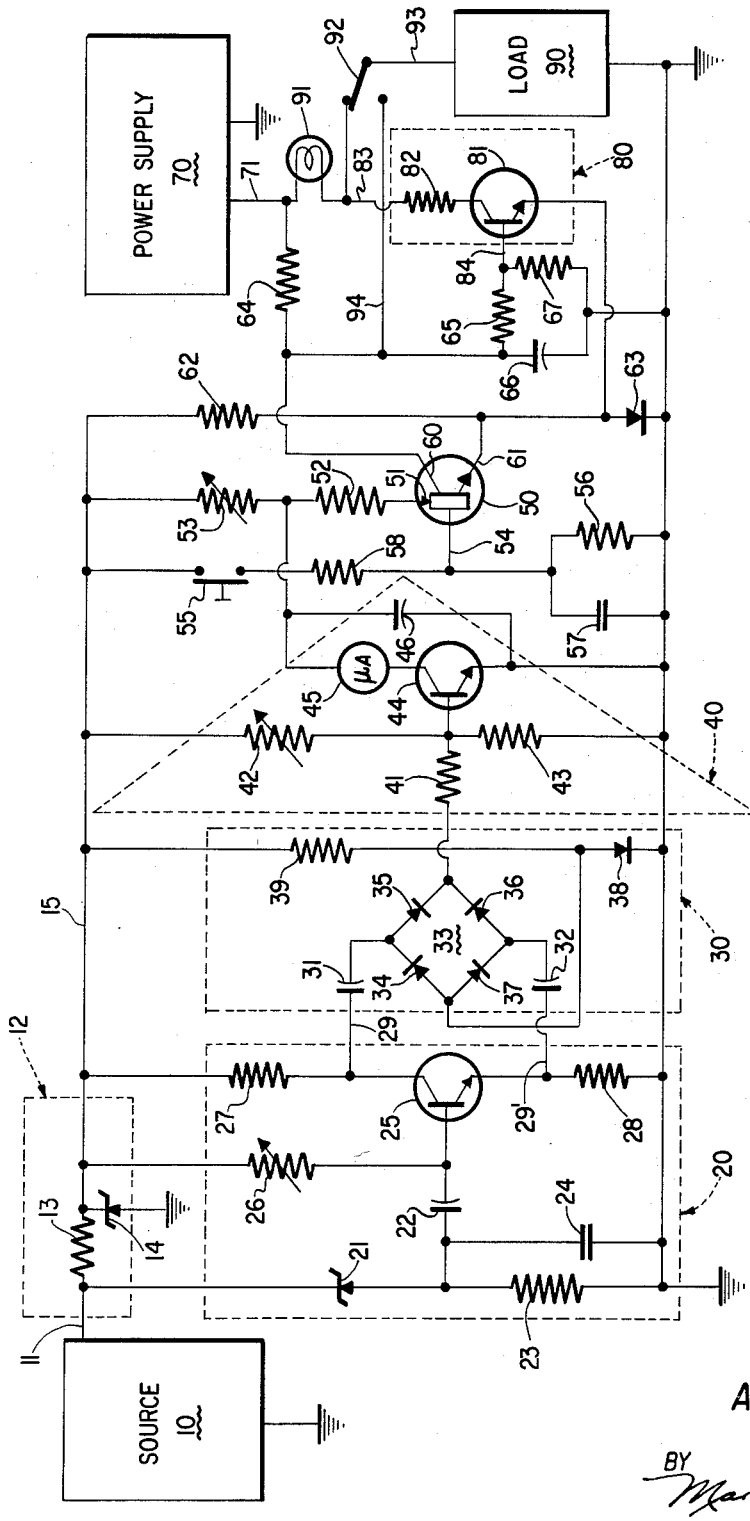

Further aspects of this invention are set forth below in connection with further description of this invention with reference to the appended drawings in which:

FIG. 1 is an electrical schematic drawing of a monitor;
FIG. 2 is a more detailed electrical schematic drawing of the monitor circuit shown in FIG. 1.

In FIG. 1, a source 10 of a direct-current signal having a normal quiescent value is connected through lead 11 and ground to the input terminals of a voltage regulator 12 and a phase inverter 20.

The voltage regulator 12 is adapted to supply a regulated direct current reference voltage. Voltage on line 15 is connected to some of the circuit components, as described below, in response to reception of the direct-current component of a signal from the source 10.

The phase inverter 20 is adapted to operate in response to variations of the signal on line 11 both positive and negative in polarity, from a normal quiescent, direct-current value and is connected to provide inputs to the appropriate terminals of a full-wave rectifier 30 for positive and negative variations of the signal.

The full-wave rectifier 30, processes the positive and negative variations received from the phase inverter and impresses an inverted and rectified signal of positive polarity with respect to the quiescent value on the input circuit of amplifier 40.

The output circuit of amplifier 40 is connected through resistor 52 to the "injector" 51 of a latching transistor 50. Because definitions of "transistor" provided by authoritative sources conflict, "transistor" as employed in this application is intended to have the following definition provided in the Sarbacher Encylopedic Dictionary of Electronics and Nuclear Engineering, Prentice-Hall, 1959, page 1318 as follows:

"Transistor. An active semiconductor device with three or more electrodes. (AIEE/IRE) *Note*: There are two basic types (1) point contact and (2) junction transistors . . ."

In this application it is contemplated that a "junction transistor" would be used in preferred embodiments. A "junction transistor" is defined in Sarbacher, supra, p. 1322, as follows:

"transistor, junction. A transistor having a base electrode and two or more junction electrodes, (AIEE/IRE) . . ."

As employed in this application, the term "latching" is intended to indicate that the transistor may be transferred to a particular state or condition of operation by actuation of one electrode thereof in a predetermined manner and retained, i.e., latched, in that state by actuation of a second electrode of the transistor in a predetermined manner. The latching transistor may comprise a device known as a "binistor." A "binistor" is a PNPN silicon semiconductor device including three junctions with an injector 51 comprising a P region having a junction with an N region comprising the collector 60 of the equivalent of an ordinary NPN junction transistor. A description of the characteristics and construction of a "binistor" may be found in an article entitled, "The Binistor—a New Semiconductor Device," by Nicholas De Wolf in Electronic Industries, August 1960. Direct current is supplied to the output circuit of the amplifier 40 and to the injector 51 in series with resistor 52 through variable resistor 53 from line 15. Direct current is supplied to the collector 60 of the transistor 50 from a separate power supply 70 through line 71 and resistor 64. Normally, the base 54 of transistor 50 is coupled to ground through the base resistor 58, and the emitter 61 is held slightly above ground potential by connection to the anode of diode 63 which is forward biased by connection of its anode to line 15 through biasing resistor 62 and connection of its cathode to ground.

*Operation*

In normal operation of the transistor 50, current flows into the injector 51 and collector 60, latching the transistor 50 in the "on" condition.

Above a predetermined, critical value of injector current, the injector operates to latch or hold the transistor 50 "on," which is its normal condition of operation. Should the current in the injector fall below that critical value, the transistor 50 will transfer to the abnormal "off" condition of operation, providing that normally-open switch 55 is not closed with normal potential on line 15, as is explained below. When the transistor 50 is "off," collector current is reduced substantially and collector potential rises sharply until it is slightly below the potential on line 71 because the IR voltage drop across resistor 64 decreases. A voltage divider circuit including resistor 64, resistor 65, and resistor 67 connected in series between line 71 and ground, determines the potential on the collector 60 when the transistor 50 is "off."

In operation, when there is a variation from the quiescent level of the signal on line 11, the impedance in the output circuit of amplifier 40 is reduced from its normal value thereby drawing more current therethrough, accordingly increasing the IR voltage drop across resistor 53 and lowering the potential on injector 51 as well as diverting current from the injector to the amplifier output circuit. As soon as the injector current falls below a normal, i.e., predetermined or critical, value, the transistor 50 is "off" and remains in stable operation in the "off" (abnormal) condition in the absence of a reset signal from switch 55.

By raising the potential on the base 54 to a potential sufficient to turn the transistor "on," the transistor 50 can be reset to its "on" (normal) condition of operation. This is accomplished by connecting the base to line 15 through switch 55 thereby providing a reset signal. The desired reset signal potential applied to base 54 is determined by a voltage divider including resistors 56 and 58. Then, if a normal, i.e., predetermined, amount of current can flow in the injector 51 at the end of the reset signal as the result of restoration of the input signal to a quiescent level and return of the resistance in the output circuit of amplifier 40 to the normal level, the current to injector 51 will latch transistor 50 "on." Should restoration of the latching current fail to occur, at the end of the reset signal from switch 55, the transistor will revert to the abnormal or "off" condition of operation.

When the transistor 50 is "off" and, as a result, the potential on collector 60 is high, the potential on input line 84 of transistor switch 80 is elevated with respect to its potential when transistor 50 is "on," thereby actuating conduction through line 83 of the switch 80. Accordingly, current will flow through incandescent lamp 91 thereby illuminating it to provide a visual display; and the input line 93 of load 90 will be at a lower potential with respect to ground because of the IR potential drop across the lamp 91. If the load is an alarm device, then it must be sensitive to a decrease in the input potential between line 93 and ground in order to provide an alarm.

In the event that it is desired to disconnect the load 90, temporarily, say because it comprises a audible alarm, armature 92 may be moved to its opposite position disconnecting load input line 93 from line 83 and connecting input line 93 to "memory circuit" line 94 which is directly connected to the collector 60. Since the collector is at a relatively high potential ("off") the load will be returned to its normal, say inactive, state. However, when the transistor 50 is turned "on," potential on collector 60 with respect to ground will drop sufficiently so that the load will be actuated thereby to present the operator with an indication or "memory signal" that armature 92 must be returned to its normal position in order to return the load to its normal condition.

An important aspect of this invention comprises the ability of the system to respond positively to reduction of the signal on line 11 to zero thereby reducing injector current to zero. Response occurs because a stand-by power supply 70, preferably, including a battery (preferably rechargeable) is used to drive the load 90, collector 60, switch 80 and associated circuit elements. If line 15 were used to supply potential to line 71 and power supply 70 were omitted, then the system would fail to respond to the total removal of power from the monitor and load. In a monitor circuit, this would means that the system could easily be defeated or compromised by cutting line 11; and if a relatively shorter life component in the source or monitor were to fail (except for those associated with power supply 70, switch 80, load 90, or lamp 91) an alarm would occur. Should the transistor 50 fail to operate, and remain in the "off" condition, the load would be actuated. Such a failure would occur as a result of inoperativeness, say, of the injector 51 or base 54 preventing latching and resetting respectively, or say, failure of the collector 60 or emitter 61 to conduct. As some components including power supply 70, lamp 91, switch 80, load 90, associated resistors 64, 65, 67, switch 92, the capacitor 66 might fail without causing a response at the load 90, the system can be checked periodically by removing the input signal from line 11. If no response is obtained at the load 90, relatively few components need be checked in order to repair the monitor. Although line 15 is connected to a number of components, line 71 could be attached in place of line 15 to all components except rheostat 53 which provides injector current and thereby permits response to reduction of current from source 10 to zero by causing reduction of injector current below the critical minimum value for latching.

Referring to FIG. 2, the voltage regulator 12 comprises a resistor 13 connected in series with a Zener diode between line 11 from source 10 and ground. The Zener reference potential is supplied on line 15 to provide a regulated direct-current reference voltage and power supply derived from source 10 and coupled to phase inverter 20, full-wave rectifier 30, amplifier 40, base 54, injector 51 and emitter 61.

In the phase inverter 20, Zener diode 21 and D.C. blocking capacitor 22, connected in series, couple variations in potential on line 11 to the base of transistor 25. Resistor 23 provides a connection to ground across which such variations appear and diode 21 provides a low impedance coupling thereto of such variations. Capacitor 24 operates to filter relatively higher frequency transients presented across resistor 23. Rheostat 26 connected between line 15 and the base of transistor 25 provides appropriate forward base-emitter bias. The collector of transistor 25 is connected to line 15 through collector resistor 27 and the emitter is connected to ground through emitter resistor 28. Resistors 27 and 28 are selected to have substantially equal values and in steady-state operation, i.e., the absence of a signal on the base, the potentials across the collector and emitter resistors are constant. The input circuit of the phase inverter has a relatively high impedance and provides two outputs on lines 29 and 29' of equal magnitudes and opposite polarity for a change in base potential with respect to ground as collector-emitter current is varied in response to an input on the base.

In operation, the system may be required to respond to a single pulse on line 11 of positive or negative polarity with respect to the quiescent signal thereon. A positive pulse coupled to the base of transistor 25 will increase the current flowing in the collector-emitter circuit thereof, thereby increasing the IR potential drops across resistors 27 and 28 and accordingly presenting a relatively negative pulse on line 29 and a relatively positive pulse on line 29'. A negative pulse or variation on the base of transistor 25 will decrease current in the collector-emitter circuit thereof thereby reducing the IR potential drop across resistors 27 and 28 and accordingly presenting a relatively positive pulse on line 29 and a relatively negative pulse on line 29'. Such pulses will be of positive or negative potentials with respect to the normal quiescent potentials on the collector and emitter of transistor 25. Pulses appearing on lines 29, 29' are coupled into rectifier 30 through D.C. blocking capacitors 31, 32 respectively to the anodes of diodes 35, 36 respectively, of diode-bridge 33, which have their cathodes interconnected and coupled to the input of amplifier 40. During quiescent operation, capacitors 31 and 32 are discharged through diodes 34 and 37 so that the potentials on the anodes of diodes 35 and 36 are substantially equal to the potentials on the collector and emitter of transistor 25, respectively. For a positive pulse on line 29, accompanied, as explained above, by a negative pulse on line 29', diode 35 will conduct the positive pulse and diode 36 will block the negative pulse. Conversely, for a negative pulse on line 29 which will likewise be accompanied by a positive pulse on line 29', diode 35 will block the negative pulse and diode 36 will conduct the positive pulse. For a pulse of either polarity on line 11, a positive pulse will appear at the anodes of diodes 35 and 36. Accordingly, only positive going pulses with respect to ground are passed to direct coupling resistor 41 of amplifier 40 through the diode bridge 33 from the phase inverter 20.

Resistor 39 is connected from line 15 to the anode of grounded-cathode auxiliary diode 38 providing continuous conduction of a small current through those two components. The small voltage drop across diode 38 is impressed on the anodes of diodes 34 and 37 through connection to the anode of diode 38. The cathodes of diodes 34 and 37 are connected respectively in bridge 33 to the anodes of diodes 35 and 36. This voltage drop supplies a small amount of forward bias to the diode-bridge 33 to improve the forward conduction capabilities of the diodes when small signals are supplied to it. Diodes 34 and 37 serve primarily to provide a return path for discharging capacitors 31 and 32 which tend to charge during rectification of signals by diodes 35 and 36.

If it were not necessary to use capacitors 31 and 32 to block D.C. collector and emitter potentials of transistor 25 from diodes 35 and 36, then of course, only diodes 35 and 36 would be necessary. Thus, the rectifier actually comprises diodes 35 and 36 and diodes 34 and 37 serve simply to maintain minimum charge on D.C. blocking capacitors 31 and 32. Moreover, diode bridge 33 is employed differently from typical diode bridge rectifiers as will be understood from the above discussion.

In amplifier 40, the base-emitter circuit of NPN transistor 44 is forward biased by rheostat 42 connected from line 15 to the base, small base-to-ground resistor 43 and grounding of the emitter. Rheostat 42 permits adjusting the quiescent collector current to a desired normal value, indicated by microammeter 45 in the collector circuit. Use of rheostat 42 and other rheostats shown in the circuit is necessary in order to compensate for variations in characteristics of transistors within tolerances and for the purpose of adjusting the sensitivity of the monitor. Capacitor 46 connected across the output of the collector circuit to ground is intended to filter adverse extraneous high-frequency pulses and signals induced in the system from sources external of the monitor.

The microammeter 45 also serves to monitor by providing a visual display of the presence of the amplified signals fed into the collector circuit of the amplifier 40.

Microammeter 45 will provide an indication of the magnitude of a signal received by the system at any time. In the event that the system is in the abnormal condition of operation, prior to reset, the microammeter will provide the only indication of repeated variations of the input signal on line 11 from the normal, quiescent value. If signals are of insufficient magnitude to cause the latching transistor to be unlatched, the microammeter will provide a visual display of the magnitude of the signal.

The collector of transistor 44 is directly coupled to the injector 51 as described above. When a signal is impressed on the base of transistor 44 the average current in the collector-emitter circuit is increased, the average collector potential drops, as does the effective resistance; and current through variable resistor or rheostat 53 is momentarily diverted from the injector 51 into the collector. The amplitude of the input to the base of transistor 44 required to reduce current in the injector below its critical value depends upon the current amplification provided by the amplifier 40 and the level of D.C. current flowing in the injector which can be adjusted by varying the value of rheostat 53. Resistor 52 can be used for the purpose of measuring the amount of injector current by connecting a meter across degree of sensitivity of the system.

In the latching transistor 50, during normal operation, the desired base potential to permit condition with the collector slightly above emitter potential is provided by self-biasing through base-ground resistor 56. The capacitor 57, like capacitors 24, and 46 serves to reduce the adverse effect of extraneous transients, pulses and signals induced in the system.

In transistor switch 80, the NPN emitter-collector circuit is normally "off" because the base of transistor 81 is connected to line 84 which is held slightly below the potential of the emitter of transistor 81. This is accomplished by coupling line 84 to collector 60 which is slightly above the potential of emitter 61, which is held at the same small positive potential as the emitter of transistor 81 by the voltage drop across diode 63 connected to ground. The voltage divider circuit comprising resistors 65 and 67 from collector 60 to ground and connected to the base of transistor 81 is designed to hold the base below the potential across diode 63.

When the latching transistor is "off," collector 60 rises to a potential suffiicient to turn transistor 81 "on" by raising its base potential, thereby actuating lamp 91 and load 90.

Capacitor 66 from collector 60 to ground serves the same purpose as capacitors 24, 46, and 57.

The power supply 70 can be operated from a utility source and contain a voltage rectifier, regulator, and a battery to assure operation in the event of interruption of utility power.

An example of a monitor circuit designed in accordance with FIG. 2, and successfully tested and operated in a security system is described below.

*Example*

Source (10).—The source supplies a D.C. signal on the order of 90 volts converted from a constant average input current of 4.5 ma. supplied thereto from an amplifier.

Voltage rectifier (12) (10 volt regulated supply):
    Resistor (13): 22K, 1 watt±5%
    Zener diode (14): SV133 (Transitron)
Phase inverter (20):
    Zener diode (21): ¾ M82Z10 (Motorola)
    Capacitor (22): 100 microfarads
    Resistor (23): 27K±5%
    Capacitor (24): 1 microfarad
    Rheostat (26): 56K fixed, 500K variable
    Transistor (25): TRS 93 (Industro Corp.)
    Resistor (27): 2.2K±5%
    Resistor (28): 2.2K±5%
Full-wave rectifier (30):
    Capacitors (31), (32): 250 microfarads
    Diodes (34), (35), (36), (37): IN67A
    Diode (38): SG 22 (Transitron)
    Resistor (39): 68K
Amplifier (40):
    Resistor (41): 8.2K
    Rheostat (42): 330K fixed, 500K variable
    Resistor (43): 22K
    Transistor (44): TRS 94 (Industro)
    Capacitor (46): 200 microfarads
Miscellaneous elements:
    Latching transistor (50): 3N57, "binistor" (Transitron)
    Resistor (52): 1K±5%
    Rheostat (53): 4.7K fixed, 10K variable
    Resistor (56): 22K
    Capacitor (57): 0.05 microfarad
    Resistor (58): 33K
    Resistor (62): 100K
    Diode (63): SG 22 (Transitron)
    Resistor (64): 5.6K
    Resistor (65): 10K
    Capacitor (66): 1 microfarad
    Resistor (67): 4.7K Power supply (70):
    Output voltage: 15 volts maximum
    Filtered D.C., 12 volt rechargeable battery
Transistor switch (80)
    Transistor (81): 2N647
    Resistor (82): 27 ohms
    Lamp (91): DS 304

The quiescent collector current of the transistor 44 was adjusted to a value between 200 and 500 microamperes with the higher values providing greater sensitivity of the injector circuit, and thus the system, to fluctuations of current in the collector circuit. The injector was usually adjusted to a current value about 300 to 400 microamperes above the critical value of injector current below which the latching transistor 50 would be "off."

Care was taken in design to prevent the voltage at the injector 51 from exceeding the supply voltage to the collector 60 in order to prevent the injector from turning the binistor "on." Otherwise the injector 51 would operate to reset the latching transistor 50 as well as to latch it. Injector reset would destroy a valuable characteristic of this system, which comprises requiring positive action to reset the circuit, such as actuation of switch 55 by an operator. In a security system the alarm should remain actuated until the operator has responded to it. In this system, he must respond by actuating switch 55 to restore normal operation.

Diode 63 develops a voltage depending on current therethrough of approximately 0.7 volt positive with respect to ground on emitter 61 and the emitter of transistor 81. In normal condition collector 60 is, say, 0.7 volt above the emitter 61 and, say, 1.4 volts above ground and since resistors 65 and 67 are 10K and 4.7K respectively the potential on the base of transistor 81 will be on the order of, say, 0.45 volt, which is below the emitter potential thereby driving base 84 of transistor 81 below cut-off which reduces the danger of response by transistor 81 to conditions such as elevated temperatures which could initiate thermally actuated current flow in the collector emitter circuit.

It will be understood that modifications can be made in the above circuit such as substituting for the latching transistor a pair of transistors having the same effect as the equivalent circuit of a "binistor" as described in the article in Electronics Industries referred to above. Accordingly, it is intended that the above description be interpreted as being illustrative and that the invention will be understood as comprising many embodiments differing from the specific embodiments described above.

This system can respond positively to reduction of the signal on line 11 to zero, and hence the current in the injector to zero. This produces a response at the load through actuation of switch 80 and the load by stand-by power supply 70. It will be obvious to those skilled in the art that any switch maintained by a D.C. potential in a "normal" condition of operation and then transferred to the abnormal condition upon reduction of the D.C. potential below a critical value could be operated advantageously by means of such a stand-by power supply system. This type of circuit would include a source such as source 10, a switch such as binistor 50, a stand-by power supply and a load actuable in response to elimination of D.C. power such as switch 80, lamp 91 and load 90. Many other combinations may be used as is obvious.

What is claimed is:

1. A monitor circuit responsive to variations of a signal from a direct-current signal level including,
    (a) means for coupling only variations from the normal direct-current level of a signal from a source, a transistor circuit having a first input circuit, a second input circuit and a bistable output circuit, said means for coupling including a rectifier, said rectifier converting variations supplied thereto to unidirectional variations, said means for coupling being connected to said first input circuit for supplying unidirectional variations to said first input circuit of said transistor circuit, (b) said bistable output circuit of said transistor circuit having normal and abnormal conditions of operation,
   transfer from said normal condition to said abnormal condition obtainable in response to reception of said unidirectional variations by said first input circuit, (c) said second input circuit of said transistor circuit actuable to transfer said transistor circuit from said abnormal condition to said normal condition, (d) said output circuit remaining in stable operation in said normal condition in the absence of reception of said unidirectional variations by said first input circuit, (e) said output circuit remaining in stable operation in said abnormal condition in the absence of actuation of said second input circuit, (f) said output circuit operative to vary an output signal as a function of said normal and abnormal conditions.

2. Apparatus in accordance with claim 1 wherein said transistor circuit includes a latching transistor having four terminals with a latching terminal connected in said first input circuit, a reset terminal connected in said second input circuit, and a pair of output terminals connected in said output circuit.

3. Apparatus in accordance with claim 1 wherein said means for coupling includes an amplifier, said amplifier being connected between said rectifier and said first input circuit, said amplifier supplying said first input circuit with a quiescent direct-current input only in the absence of reception of said unidirectional variations by said amplifier from said rectifier,
   an independent source of power connected in said output circuit for providing power thereto,
   said output circuit being in said abnormal condition in the absence of application of said quiescent input to said first input circuit through said amplifier.

4. Apparatus in accordance with claim 1 wherein said transistor circuit includes a PNPN transistor having injector, collector, base, and emitter electrodes, with said injector connected in said first input circuit, said collector and emitter connected in said output circuit and said base connected in said second input circuit.

5. Apparatus in accordance with claim 4 wherein said PNPN transistor comprises a binistor.

6. Apparatus in accordance with claim 1 wherein said output circuit of said rectifier is coupled to said first input circuit through an amplifier.

7. Apparatus in accordance with claim 6 wherein said transistor circuit includes a latching transistor having four terminals including a latching terminal connected in said first input circuit, a reset terminal connected in said second input circuit, and a pair of output terminals connected in said output circuit of said transistor circuit.

8. Apparatus in accordance with claim 6 wherein said transistor circuit includes a PNPN transistor having injector, collector, base, and emitter electrodes, with said injector connected in said first input circuit, said collector and emitter connected in said output circuit and said base connected in said second input circuit.

9. Apparatus in accordance with claim 8 wherein said PNPN transistor comprises a binistor.

10. A monitor circuit responsive to variations of a signal presented thereto from a normal direct-current signal level comprising (a) a phase inverter having a pair of output circuits for providing outputs of substantially equal magnitudes and opposite polarity means for connection to a signal source capacitively coupled to said phase inverter, reset means for providing a reset input, an amplifier having an input circuit and an output circuit for providing in its output circuit a predetermined input in its quiescent condition and an alarm input in its excited condition, said alarm input differing sharply from said predetermined input, (b) a full-wave rectifier having a pair of input circuits each coupled to one of said output circuits of said phase inverter, (c) said rectifier having an output circuit coupled to said input circuit of said amplifier, (d) a latching transistor circuit having a reset element, normal and abnormal conditions of operation, and a latching element for retaining said latching transistor circuit in said normal condition during application of said predetermined input to said latching element, from said output circuit of said amplifier said latching element being coupled to said output circuit of said amplifier, (e) said latching transistor circuit being in said abnormal condition in the absence of application of said predetermined input to said latching element from said amplifier and in the absence of application of said reset input to said reset element from said reset means, (f) said reset element actuable in the absence of said alarm input to reset said latching transistor circuit to said normal condition from said abnormal condition in response to said reset input, (g) said output circuit of said amplifier providing said alarm input thereby varying the input to said latching element from said predetermined input in response to presence of an alternating-current signal in said means for connection to a signal source, (h) said latching transistor circuit having an output circuit for providing a normal output signal in said normal condition and an abnormal output signal in said abnormal condition.

11. Apparatus in accordance with claim 10 including voltage reference means having input and output circuits for providing a stable direct-current signal in said output circuit thereof in response to a direct-current input to said input circuit thereof, said input circuit of said reference means connected to said means for connection to a signal source, said latching element coupled to said output circuit of said reference means, a separate source of electrical power for supplying energy to said output circuit of said latching transistor.

12. In an electrical circuit providing an output signal in response to deviations of an electrical input signal from a predetermined quiescent level the combination including (a) a full-wave rectifier having input and output circuits, for rectifying an electrical potential, (b) an amplifier having an input circuit and an output circuit for providing a substantial change in the impedance of said output circuit in response to an input of a predetermined potential in said input circuit, the input circuit of said amplifier being coupled to the output circuit of said full-wave rectifier, (c) a bistable transistor having four terminals including
   a variable impedance circuit of said transistor capable of operating in a high-impedance condition and a low-impedance condition,
   a first pair of said four terminals being connected to said variable impedance circuit and means for at will providing a reset input within a first predetermined range of amplitudes connected to a terminal,
      said third terminal of said four terminals adapted to cause said transistor to operate in said low-impedance condition upon application to said third terminal of an input within said first predetermined range of amplitudes,
      a fourth terminal adapted to retain said transistor in said low-impedance condition upon application to said fourth terminal of a second input within a second predetermined range of amplitudes, said fourth terminal being coupled to said output circuit of said amplifier, said amplifier and said rectifier cooperating with said fourth terminal to actuate operation of said bistable transistor in said high-impedance condition during deviation of an electrical input signal to said rectifier from a predetermined quiescent level, (d) an output switch having an input circuit and an output circuit, said first pair of terminals being connected to actuate said input circuit of said output switch during operation of said bistable transistor in said high-impedance condition, the output circuit of said output switch being connected to couple energy to a load for actuation thereof during operation of said bistable transistor in said high-impedance condition.

13. In an electrical circuit for providing an output signal in response to deviation of the direct-current level of an electrical potential from a predetermined normal quiescent magnitude, the combination including, (a) a full-wave rectifier having input and output terminals, a transistor amplifier having an input circuit connected to said output terminals said amplifier having an output circuit normally having a high impedance and having a relatively low-impedance for an electrical potential exceeding a predetermined potential applied to said input circuit, (b) a PNPN transistor device having injector, collector, base, and emitter electrodes, said collector electrode being connected in a collector circuit, trigger means for providing a trigger input signal coupled to said base electrode, said injector electrode being connected to said output circuit of said transistor amplifier and normally current biased thereby to latch said transistor device with saturation current in said collector circuit subsequent to application by said trigger means of a trigger input signal to said base electrode of said transistor device, (c) said output circuit of said transistor amplifier being connected to shunt current flowing to said injector electrode thereby cutting off saturation current in said collector circuit during presence of said relatively low-impedance in said output circuit of said transistor amplifier, (d) a transistor switch having an input circuit coupled to said collector circuit and an output circuit coupled to a load, (e) said emitter electrode and said collector circuit being connected to an independent source of bias.

14. In a circuit responsive to deviation of an input signal from a predetermined level, the combination including, (a) a phase inverter, a full-wave rectifier having an input circuit capacitively coupled to the outputs of said phase inverter, said phase inverter being adapted to be coupled to a source of an input signal to be monitored for deviation from a predetermined level, (b) a coupling circuit connected to the output of said full-wave rectifier having an output impedance having a first value in the absence of an input from said full-wave rectifier, and having a second value in response to an output signal from said full-wave rectifier, (c) a switch having normal and abnormal conditions of operation and a latching circuit coupled to said output impedance of said coupling circuit and responsive to presence of said first value of said output impedance to latch said switch in said normal condition, (d) said switch having a reset circuit actuable to reset said switch to a normal condition, means for emitting a reset signal coupled to said reset circuit to actuate said reset circuit, (e) said switch operating in said abnormal condition during the presence of said second output impedance during the absence of a reset signal in said reset circuit, (f) an output circuit in said switch in a first state during said normal condition of said switch and in a second state in said abnormal condition of operation, (g) said output circuit of said switch being coupled to a load.

References Cited by the Examiner

UNITED STATES PATENTS

| | | | |
|---|---|---|---|
| 2,963,692 | 12/1960 | Barter et al. | 340—256 |
| 3,058,036 | 10/1962 | Reuther et al. | 317—31 |
| 3,135,951 | 6/1964 | Byrne | 340—213 |
| 3,167,755 | 1/1965 | Larrick et al. | 340—276 |
| 3,177,377 | 4/1965 | Brown | 307—88.5 |

OTHER REFERENCES

"The Binistor—a New Semiconductor Device," by De Wolf in Electronic Industries, August 1960, pp. 84 to 87 relied on.

GEORGE N. WESTBY, *Primary Examiner.*

JOHN W. HUCKERT, ARTHUR GAUSS, *Examiners.*

R. H. EPSTEIN, *Assistant Examiner.*